(12) United States Patent
Katou

(10) Patent No.: US 12,021,651 B2
(45) Date of Patent: Jun. 25, 2024

(54) INFORMATION PROCESSING DEVICE

(71) Applicant: DENSO CORPORATION, Kariya (JP)

(72) Inventor: Kazuo Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 213 days.

(21) Appl. No.: 17/487,584

(22) Filed: Sep. 28, 2021

(65) Prior Publication Data

US 2022/0014392 A1 Jan. 13, 2022

Related U.S. Application Data

(63) Continuation of application No. PCT/JP2020/006197, filed on Feb. 18, 2020.

(30) Foreign Application Priority Data

Apr. 1, 2019 (JP) .................................. 2019-069778

(51) Int. Cl.
*H04L 12/40* (2006.01)

(52) U.S. Cl.
CPC ...... *H04L 12/40* (2013.01); *H04L 2012/40273* (2013.01)

(58) Field of Classification Search
CPC .... B60W 50/04; B60W 50/16; B60W 40/107; H04L 67/12; H04L 63/08; H04L 63/123; H04W 4/48; B60R 16/023
See application file for complete search history.

(56) References Cited

U.S. PATENT DOCUMENTS

| | | | | |
|---|---|---|---|---|
| 2011/0208884 A1* | 8/2011 | Horihata | ........... | H04L 12/40143 710/105 |
| 2014/0328352 A1* | 11/2014 | Mabuchi | ............. | H04L 12/4035 370/451 |

(Continued)

FOREIGN PATENT DOCUMENTS

| | | |
|---|---|---|
| JP | 2015105056 A | 6/2015 |
| JP | 2018152842 A | 9/2018 |

(Continued)

OTHER PUBLICATIONS

Data Relation Analysis Method Based on Data Transition for Attack Detection on Vehicle, Jun Yajima, Takayuki Hasebe, Takao Okubo, SCIS2019 2019: Symposium on Cryptography and Information Security, Shiga, Japan Jan. 22-25, 2019, The Institute of Electronics, Information and Communication Engineers.

(Continued)

*Primary Examiner* — Mahran Y Abu Roumi
(74) *Attorney, Agent, or Firm* — Harness, Dickey & Pierce, P.L.C.

(57) ABSTRACT

An information processing device is connected via a communication network to a different information processing device. In the information processing device, a periodic message is received as a learning periodic message from the different information processing device. A reception interval is calculated between (i) a one message of the learning periodic message and (ii) a different message that is received immediately before the one message. A reference value of the reception interval of the periodic message is judged based on the calculated reception interval. The reference value is used as a judgment reference to judge whether or not a judgment target periodic message is normal. The judgment target periodic message is the periodic message transmitted (Continued)

by the different information processing device after the reference value is determined.

11 Claims, 9 Drawing Sheets

(56) References Cited

U.S. PATENT DOCUMENTS

| | | | |
|---|---|---|---|
| 2017/0026198 A1* | 1/2017 | Ochiai | H04L 12/6418 |
| 2017/0171051 A1* | 6/2017 | Joo | H04L 47/24 |
| 2018/0077042 A1* | 3/2018 | Kim | H04L 12/4625 |
| 2019/0104204 A1* | 4/2019 | Kawakami | H04L 1/205 |
| 2019/0140778 A1* | 5/2019 | Kishikawa | G07C 5/0808 |
| 2020/0014758 A1* | 1/2020 | Kamiguchi | B60W 50/04 |
| 2021/0152287 A1 | 5/2021 | Kishikawa et al. | |

FOREIGN PATENT DOCUMENTS

| | | |
|---|---|---|
| JP | 2018160851 A | 10/2018 |
| JP | 2019009617 A | 1/2019 |
| JP | 2019068253 A | 4/2019 |
| WO | WO-2013094072 A1 | 6/2013 |

OTHER PUBLICATIONS

Jun Yajima, Takayuki Hasebe, Takao Okubo, Data Relation Analysis Method Based on Data Transition for Attack Detection on Vehicle, SCIS2019 2019: Symposium on Cryptography and Information Security, Shiga, Japan Jan. 22-25, 2019, The Institute of Electronics, Information and Communication Engineers.

* cited by examiner

FIG. 5
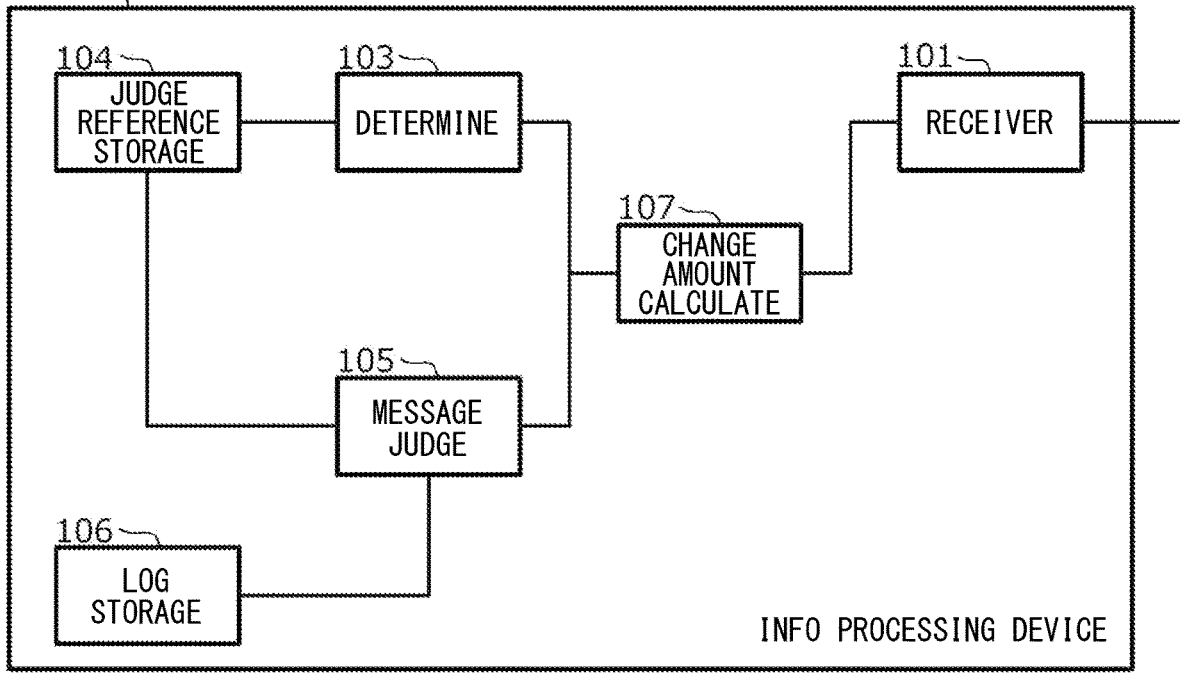
FIG. 6
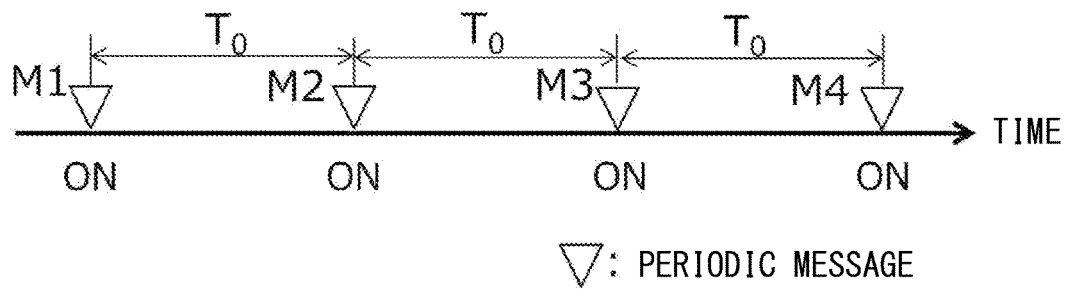
▽ : PERIODIC MESSAGE
FIG. 7
| CHANGE AMOUNT TO PERIODIC MESSAGE | OCCURRENCE PROBABILITY |
|---|---|
| 0 | 100% |
| 1 | 0% |

▽: PERIODIC MESSAGE

| PREVIOUS MSG | PERIODIC MSG (PRESENT) | CHANGE AMOUNT TO PERIODIC MESSAGE | OCCURRENCE PROBABILITY |
|---|---|---|---|
| 1 | 1 | 0 | 100% |
| 1 | 2 | 1 | 0% |
| 1 | 3 | 2 | 0% |
| 1 | 4 | 3 | 0% |
| 2 | 1 | -1 | 0% |
| 2 | 2 | 0 | 100% |
| 2 | 3 | 1 | 0% |
| 2 | 4 | 2 | 0% |
| 3 | 1 | -2 | 0% |
| 3 | 2 | -1 | 0% |
| 3 | 3 | 0 | 100% |
| 3 | 4 | 1 | 0% |
| 4 | 1 | -3 | 0% |
| 4 | 2 | -2 | 0% |
| 4 | 3 | -1 | 0% |
| 4 | 4 | 0 | 100% |

MSG: MESSAGE

FIG. 12
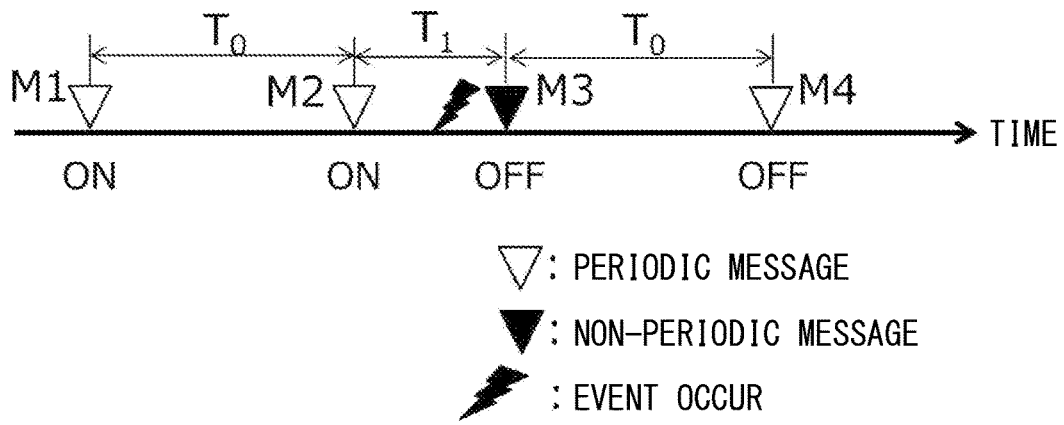
FIG. 13
| CHANGE AMOUNT TO NON-PERIODIC MESSAGE | OCCURRENCE PROBABILITY |
|---|---|
| 0 | 30% |
| 1 | 70% |
FIG. 14
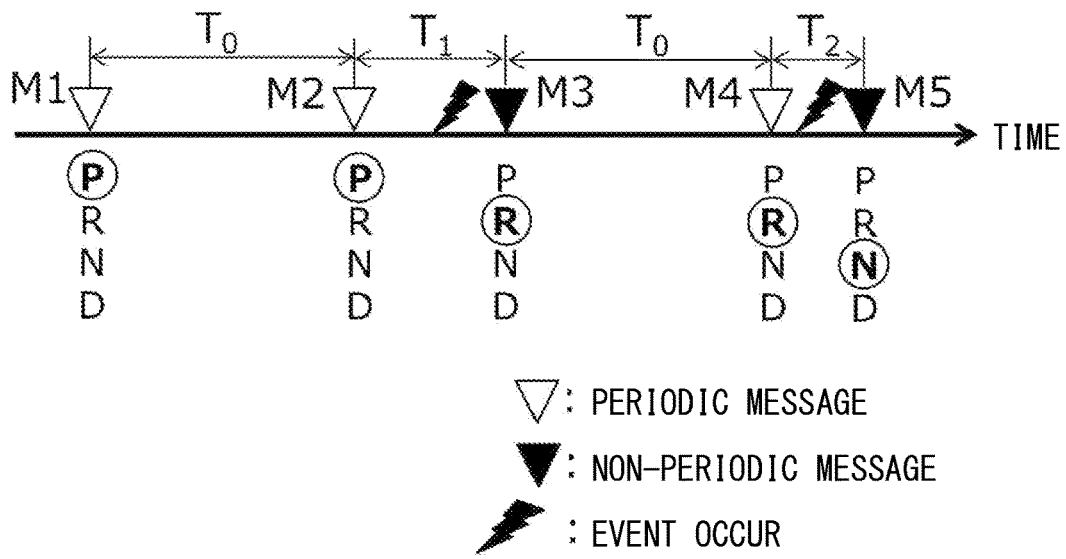

FIG. 15

| PREVIOUS MSG | NON-PERIODIC MSG (PRESENT) | CHANGE AMOUNT TO NON-PERIODIC MESSAGE | OCCURRENCE PROBABILITY |
|---|---|---|---|
| 1 | 1 | 0 | 60% |
| 1 | 2 | 1 | 35% |
| 1 | 3 | 2 | 3% |
| 1 | 4 | 3 | 2% |
| 2 | 1 | -1 | 30% |
| 2 | 2 | 0 | 35% |
| 2 | 3 | 1 | 30% |
| 2 | 4 | 2 | 5% |
| 3 | 1 | -2 | 10% |
| 3 | 2 | -1 | 40% |
| 3 | 3 | 0 | 10% |
| 3 | 4 | 1 | 40% |
| 4 | 1 | -3 | 10% |
| 4 | 2 | -2 | 10% |
| 4 | 3 | -1 | 30% |
| 4 | 4 | 0 | 40% |

MSG: MESSAGE

▽ : PERIODIC MESSAGE
▼ : NON-PERIODIC MESSAGE
⚡ : EVENT OCCUR

INFORMATION PROCESSING DEVICE

CROSS REFERENCE TO RELATED APPLICATIONS

The present application is a continuation application of International Patent Application No. PCT/JP2020/006197 filed on Feb. 18, 2020, which designated the U.S. and claims the benefit of priority from Japanese Patent Application No. 2019-069778 filed on Apr. 1, 2019. The entire disclosures of all of the above applications are incorporated herein by reference.

TECHNICAL FIELD

This application relates to an information processing device, and mainly relates to an information processing device for vehicles.

BACKGROUND

There are known various types of information processing devices mounted on automobiles. Such various types of information processing devices are connected with each other by a communication network such as CAN (Controller Area Network) to configure an in-vehicle system. In such an in-vehicle system, there is known a network-based intrusion detection system (NIDS) used to detect suspicious access or data from the outside.

There is disclosed a communication system and a communication method capable of judging the correctness/incorrectness of a message communicated by a communication system with a simple configuration. In this communication system, a plurality of ECUs are connected to a communication bus in order to enable communication of messages. A specified communication interval is set for each ECU; the ECU transmits the message based on the specified communication interval. Upon receiving the transmitted message, the ECU detects the communication interval of the received message, and judges whether the received message is correct/incorrect based on the comparison between the detected communication interval and the specified communication interval.

SUMMARY

According to an example of the present disclosure, an information processing device is provided to be connected via a communication network to a different information processing device. In the information processing device, a periodic message is received as a learning periodic message from the different information processing device. A reception interval is calculated between (i) a one message of the learning periodic message and (ii) a different message that is received immediately before the one message. A reference value of the reception interval of the periodic message is judged based on the calculated reception interval. The reference value is used as a judgment reference to judge whether or not a judgment target periodic message is normal. The judgment target periodic message is the periodic message transmitted by the different information processing device after the reference value is determined.

BRIEF DESCRIPTION OF DRAWINGS

The objects, features, and advantages of the present disclosure will become more apparent from the following detailed description made with reference to the accompanying drawings. In the drawings:

FIG. 5 is a block diagram of an information processing device according to a second embodiment;

FIG. 6 is a diagram illustrating a message reception state according to the second embodiment;

FIG. 7 is a diagram for explaining the amount of change in the message according to the second embodiment;

FIG. 12 is a diagram illustrating a message reception state according to the third embodiment;

FIG. 13 is a diagram for explaining the amount of change in the message according to the third embodiment;

FIG. 14 is a diagram illustrating a message reception state according to the third embodiment;

FIG. 15 is a diagram illustrating the amount of change in the message according to the third embodiment;

DETAILED DESCRIPTION

Hereinafter, embodiments of the present disclosure will be described with reference to the drawings. The present disclosure shown below means the disclosure described in the claims, and is not limited to the following embodiments. The configurations and methods described in the dependent clauses of the claims, the configurations and methods of the embodiments corresponding to the configurations and methods described in the dependent clauses, and the configurations and methods described only in the embodiments not described in the claims, are optional configurations and methods in the present disclosure. The configuration and method described in the embodiment in the case where the description of the claims is wider than the description of the embodiment is also an optional configuration and method in the present disclosure in the sense that it is an example of the configuration and method of the present disclosure. Any effects described in embodiments are effects obtained by a configuration of an embodiment as an example of the present disclosure, and are not necessarily effects of the present disclosure. In the present disclosure, the configuration disclosed in each embodiment is not limited to each embodiment alone, but may be combined across the embodiments. For example, a configuration disclosed in one embodiment may be combined with other embodiments. Further, the disclosed configurations may be collected and combined in each of multiple embodiments. The problem described in the present disclosure is not a publicly known problem, but person including the inventor has independently found out, and is a fact that affirms the inventive step together with the configuration and method of the present disclosure.

First Embodiment

Figure 1:
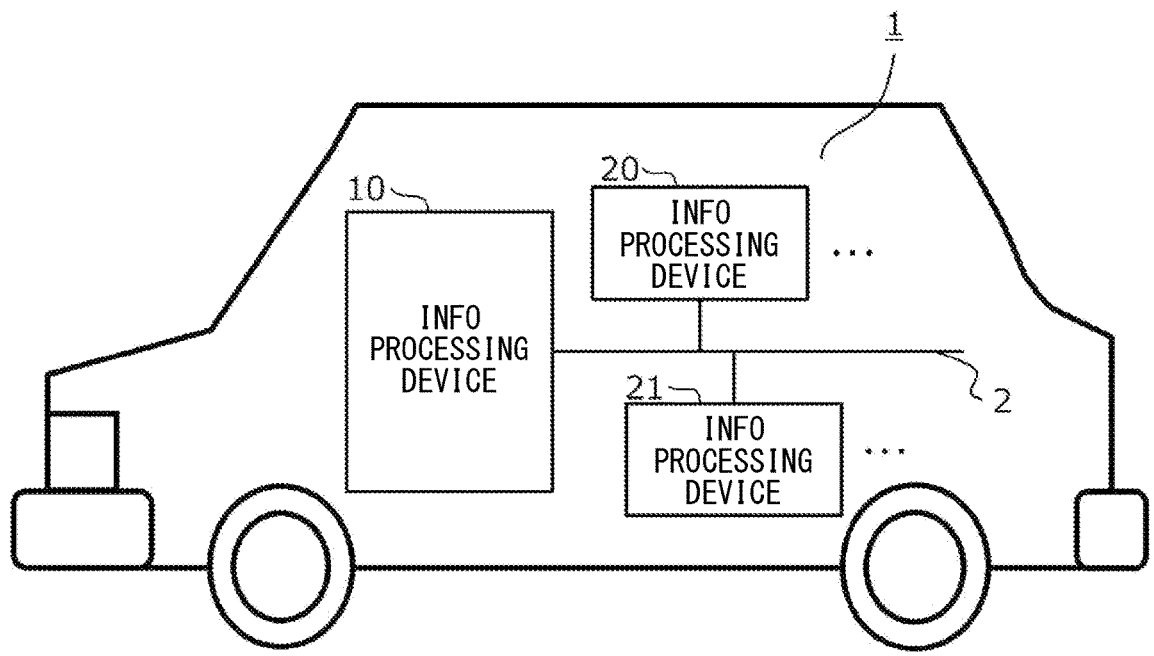
FIG. 1 is a diagram illustrating an in-vehicle system including an information processing device of the present disclosure.

FIG. 1 shows an in-vehicle system 1 including a plurality of information processing devices 10, 20, 21 and a communication network 2 connecting the information processing devices to each other. Of the plurality of information processing devices shown in FIG. 1, the information processing device 10 configured as a gateway is an information processing device of the present embodiment. In the embodiment shown below, a configuration is described in which the information processing device 10 receives a message transmitted from the information processing device 20 and performs processing described later. In the following description, the information processing device 20 that transmits a message to the information processing device 10 of the present disclosure is referred to as a transmission source information processing device (which may also be referred to as another information processing device or a different information processing device). The information processing device 10 of the present disclosure is not limited to the information processing device of the gateway.

The communication network 2 may use such communication standards as, for example, CAN (Controller Area Network), LIN (Local Interconnect Network), Ethernet (registered trademark), Wi-Fi (registered trademark), and any other suitable communications. In the following example, an example using CAN will be described.

The transmission source information processing device 20 of the present embodiment transmits periodic messages to the information processing device 10. The periodic message of the present disclosure is a message transmitted after a fixed period of time from when an immediately preceding message is transmitted. The fixed period of time, which is the message transmission interval, is predetermined, but may differ depending on the type of vehicle equipped with the in-vehicle system 1. The message transmitted by the transmission source information processing device 20 includes various data detected by an in-vehicle sensor or the like.

Here, the message is data transmitted and received via a communication network, and may be a data frame including a plurality of data, or may be a data itself included in the data frame.

Figure 2:
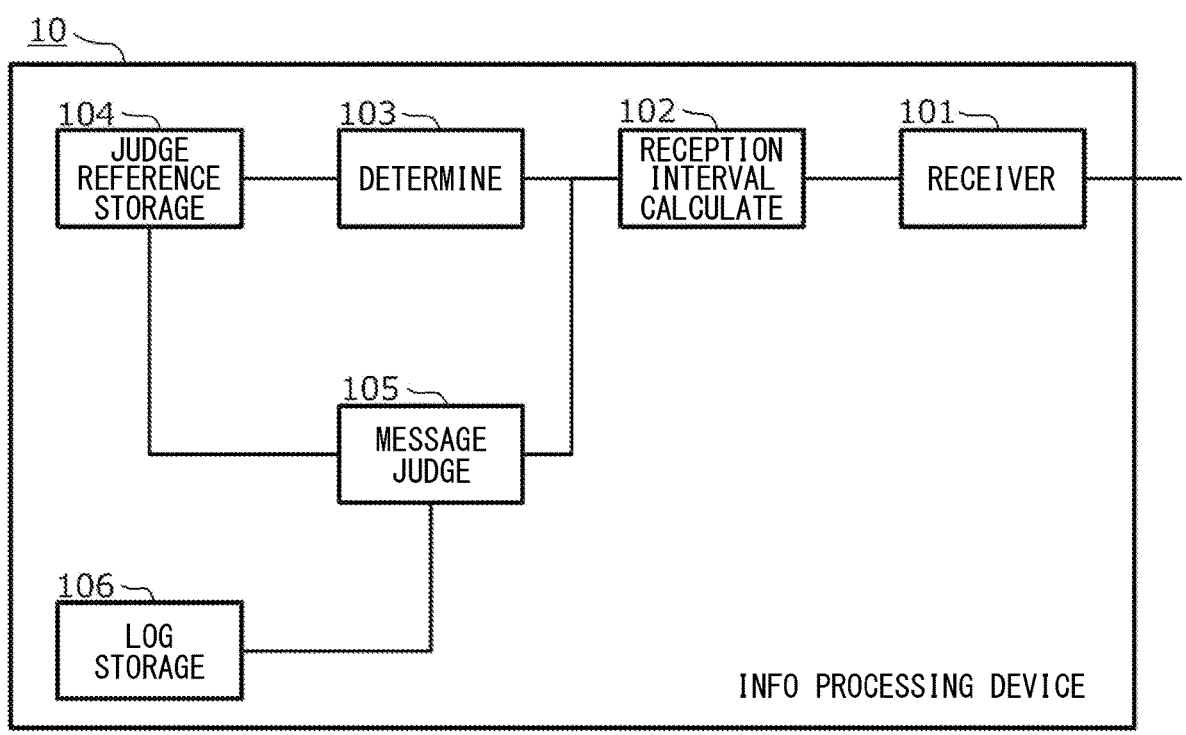
FIG. 2 is a block diagram of an information processing device according to a first embodiment.

FIG. 2 shows the configuration of the information processing device 10. The information processing device 10 includes a receiver unit 101, a reception interval calculation unit 102, a determination unit 103, a judgment reference storage unit 104, a message judgment unit 105, and a log storage unit 106. The physical structures or configurations of the information processing device 10 and other information processing devices 20, 21, 11, 12, and 13 will be described to be later in detail.

The receiver unit 101, which may also be referred to as a receiver 101, receives the periodic message transmitted from the transmission source information processing device 20. As will be described later, in the present embodiment, the periodic message received by the receiver unit 101 is used for learning a judgment reference for judging whether or not the periodic message is normal. At the same time, it is also used as a judgment target for judging whether or not it is normal using the judgment reference. That is, the receiver unit 101 receives the periodic message as a learning periodic message for determining the judgment reference, and also receives the periodic message as a judgment target periodic message for judging whether or not the periodic message is normal.

The reception interval calculation unit 102 calculates a reception interval between (i) one message of the learning periodic messages received by the receiver unit 101 and (ii) another message (i.e., different message) received by the receiver unit 101 immediately before the one message. The reception interval calculation unit 102 further calculates a reception interval between one message of the judgment target periodic messages received by the receiver unit 101 and another message received by the receiver unit 101 immediately before the one message.

The determination unit 103 determines the reference value of the reception interval of the periodic message received by the receiver unit 101 based on the reception interval of the learning message calculated by the reception interval calculation unit 102. As will be described later, the reference value determined by the determination unit 103 is used as a judgment reference for judging whether or not a judgment target periodic message is normal. This judgment target periodic message is the periodic message transmitted by the transmission source information processing device 20 after the reference value is determined. Here, the reference value may include a value for a reference, and does not necessarily have to be one value. For example, the reference value may be two values such as a lower limit value and an upper limit value.

As described above, the transmission source information processing device 20 transmits periodic messages at regular intervals, but the receiver unit 101 may not always be able to receive the periodic messages at regular intervals depending on the state of the communication network 2. Therefore, it is desirable that the determination unit 103 determines the reference value based on a plurality of reception intervals. Therefore, the determination unit 103 collects the reception intervals of a plurality of learning messages received by the receiver unit 101 to obtain a reference value.

The method in which the determination unit 103 obtains the reference value of the reception interval is optional. For example, the determination unit 103 obtains the average value of a plurality of reception intervals and determines the obtained average value as a reference value. Alternatively, the determination unit 103 further obtains the standard deviation σ of the plurality of reception intervals. Thereafter, the value obtained by the average value−standard deviation σ is determined as the minimum reference value; the value obtained by the average value+standard deviation σ is determined as the maximum reference value. The reference value determined by the determination unit 103 may be one specific value or two values indicating the upper and lower limits of the reference value.

It is desirable that the determination unit 103 uses the periodic message received by the receiver unit 101 as a learning message, and the time for starting learning is set in advance. For example, the time when the vehicle is first started (i.e., in a first started state) at a vehicle manufacturing factory or the like is set as the time for starting learning. Then, when a predetermined number (for example, N) of reception intervals of the learning messages are collected after the first start of the vehicle, or when a predetermined period of time elapses after the first start of the vehicle, the determination unit 103 determines the reference value of the reception interval.

As another example, when an external device is connected to the information processing device 10 and a signal is received from the external device at a dealer or a maintenance shop, learning may be started. Alternatively, learning may be started when the power supply or ignition of the vehicle is turned on, or when a specific operation is performed in the vehicle. Such a specific operation performed in the vehicle include (i) operating a dedicated switch provided in the vehicle and (ii) operating a plurality of buttons and steering wheel at the same time (for example, pressing a plurality of buttons while stepping on the brake, stepping on the brake a plurality of times).

As yet another example, learning may be started when it is detected that the vehicle is in a predetermined state, for example, when the speed of the vehicle becomes equal to or higher than a predetermined speed. The in-vehicle system 1 may include a device or system that operates only when the vehicle is in a predetermined state. For example, the lane departure prevention system operates at a vehicle speed of a predetermined speed (for example, 30 km/h) or higher. In such a system, when the vehicle is below a predetermined speed, the system is stopped; thus, the message is not transmitted. Therefore, it is not possible to learn the reference value based on the reception interval. Therefore, learning in such a system is started when the speed of the vehicle becomes equal to or higher than a predetermined speed.

Further, immediately after the vehicle is first started or immediately after the vehicle power supply or ignition is turned on, the state of the in-vehicle system 1 or the communication network 2 may not be stable and the message reception interval may not be constant. Therefore, in order to improve the accuracy of the reference value of the reception interval, the periodic message received within a certain period of time after the vehicle is started does not have to be used as a learning message. Further, the information processing device 10 further includes a monitoring unit (not shown) for monitoring the state of the communication network 2. When the monitoring unit detects (i) a high load on the communication network 2 or (ii) an abnormality or error that has occurred in the communication network 2, the periodic message received by the receiver unit 101 during that period may not be used as a learning message.

In the embodiment shown below, the reference value is determined based on the reception intervals of the predetermined number (for example, N) of learning messages. However, the determination unit 103 may use all the periodic messages received by the receiver unit 101 as learning messages to determine the reference value. In this case, every time the receiver unit 101 receives the periodic message, the reference value of the reception interval is continuously or consecutively updated, so that the accuracy of the reference value can be further improved.

The judgment reference storage unit 104 (which may also be referred to as a storage unit or a storage) stores the initial reference value of the reception interval, which is a preset judgment reference. This initial reference value may be one specific value or two values indicating the upper and lower limits of the reference value, like the reference value determined by the determination unit 103.

The judgment reference storage unit 104 also stores the reference value of the reception interval, which is the judgment reference determined by the determination unit 103.

The message judgment unit 105 uses the reference value determined by the determination unit 103 as the judgment reference to judge whether or not the periodic message received by the receiver unit 101 as the judgment target periodic message is normal. Until the determination unit 103 determines the reference value of the reception interval, the message judgment unit 105 judges whether or not the periodic message (which may also referred to as a first judgment target periodic message) is normal, based on the initial reference value stored in the judgment reference storage unit 104. Further, after the determination unit 103 determines the reference value of the reception interval, the message judgment unit 105 judges whether or not the periodic message (which may also be referred to as a second judgment target periodic message) is normal based on the reference value of the reception interval determined by the determination unit 103.

Specifically, the message judgment unit 105 compares, with each other, (i) the reception interval between the periodic message received by the receiver unit 101 as the judgment target periodic message and the message received immediately before it, and (ii) the initial reference value stored in the judgment reference storage unit 104 or the reference value determined by the determination unit 103. For example, suppose a case where (i) the reception interval between the periodic message received by the receiver unit 101 and the message immediately before it is 50.25 msec, (ii) the maximum initial reference value of the reception interval is 49.5 msec, and (iii) the minimum initial reference value is 50.5 msec. In such a case, the message judgment unit 105 judges that the periodic message received by the receiver unit 101 is normal. On the other hand, suppose a case where (i) the reception interval between the periodic message received by the receiver unit 101 and (ii) the message immediately before it is 49.45 msec. In such a case, the message judgment unit 105 judges that the periodic message received by the receiver unit 101 is not normal. The same applies to the case where the periodic message is judged using the reference value of the reception interval determined by the determination unit 103.

It is noted that the initial reference value or the reference value determined by the determination unit 103 may be one specific value. In this case, it is desirable to set an error range in advance and judge whether or not the message is normal based on whether or not the reception interval between the two received messages is within the error range of the reference value. The transmission source information processing device 20 transmits periodic messages at predetermined transmission intervals, but a delay may occur due to congestion in the communication network 2. Therefore, by setting the error range in advance, it is possible to prevent the delayed normal message from being judged to be abnormal.

When the message judgment unit 105 judges that the periodic message is not normal, the log storage unit 106 (which may also be referred to as a storage unit or a storage) stores a log indicating that an abnormal periodic message is received. In the log storage unit 106, in addition to the log indicating that an abnormal periodic message is received, the time when the periodic message is received and the content of the periodic message may be recorded together.

Figure 3:
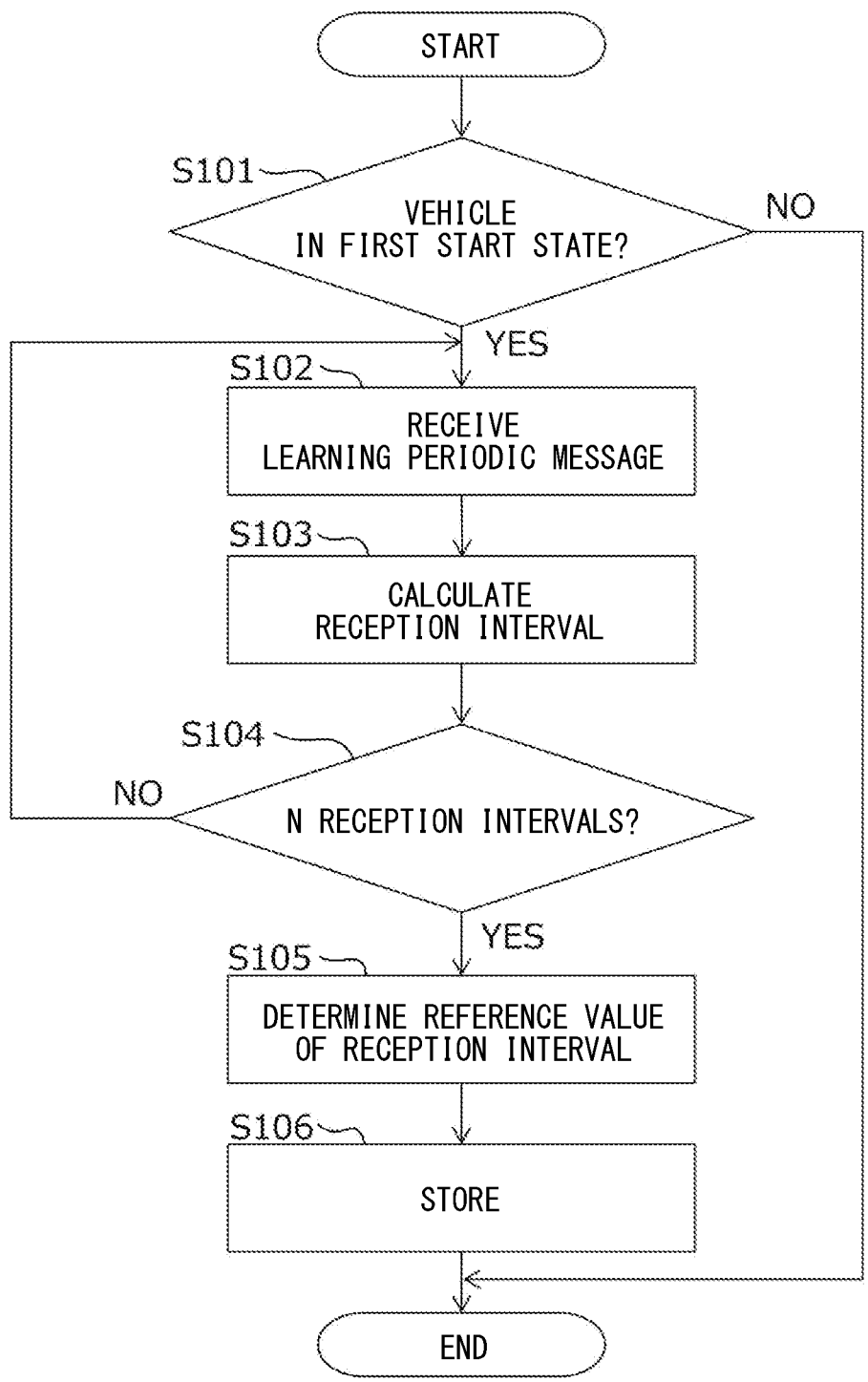
FIG. 3 is a diagram illustrating the operation of the information processing device according to the first embodiment.

FIG. 3 shows an example of the operation related to the determination of the judgment reference among the operations of the information processing device 10 of the present embodiment. First, the determination unit 103 judges whether or not the vehicle is in the first started state (S101). When the vehicle is in the first started state (S101: Yes), the periodic message transmitted from the transmission source information processing device 20 is received as a learning periodic message (S102). The reception interval between the received learning periodic message and the message received immediately before it is calculated (S103). On the other hand, when the vehicle is not in the first started state (S101: No), the processing after S102 shown in FIG. 3 is not performed. The processing of S102 to S104 is repeated until the preset N reception intervals are collected. Then, when N reception intervals are collected (S104: Yes), the determination unit 103 determines a reference value of the reception interval used as a judgment reference for judging whether or not the periodic message transmitted by the transmission source information processing device 20 is normal (S105). The reference value determined by the determination unit 103 is stored in the judgment reference storage unit 104 (S106).

Figure 4:
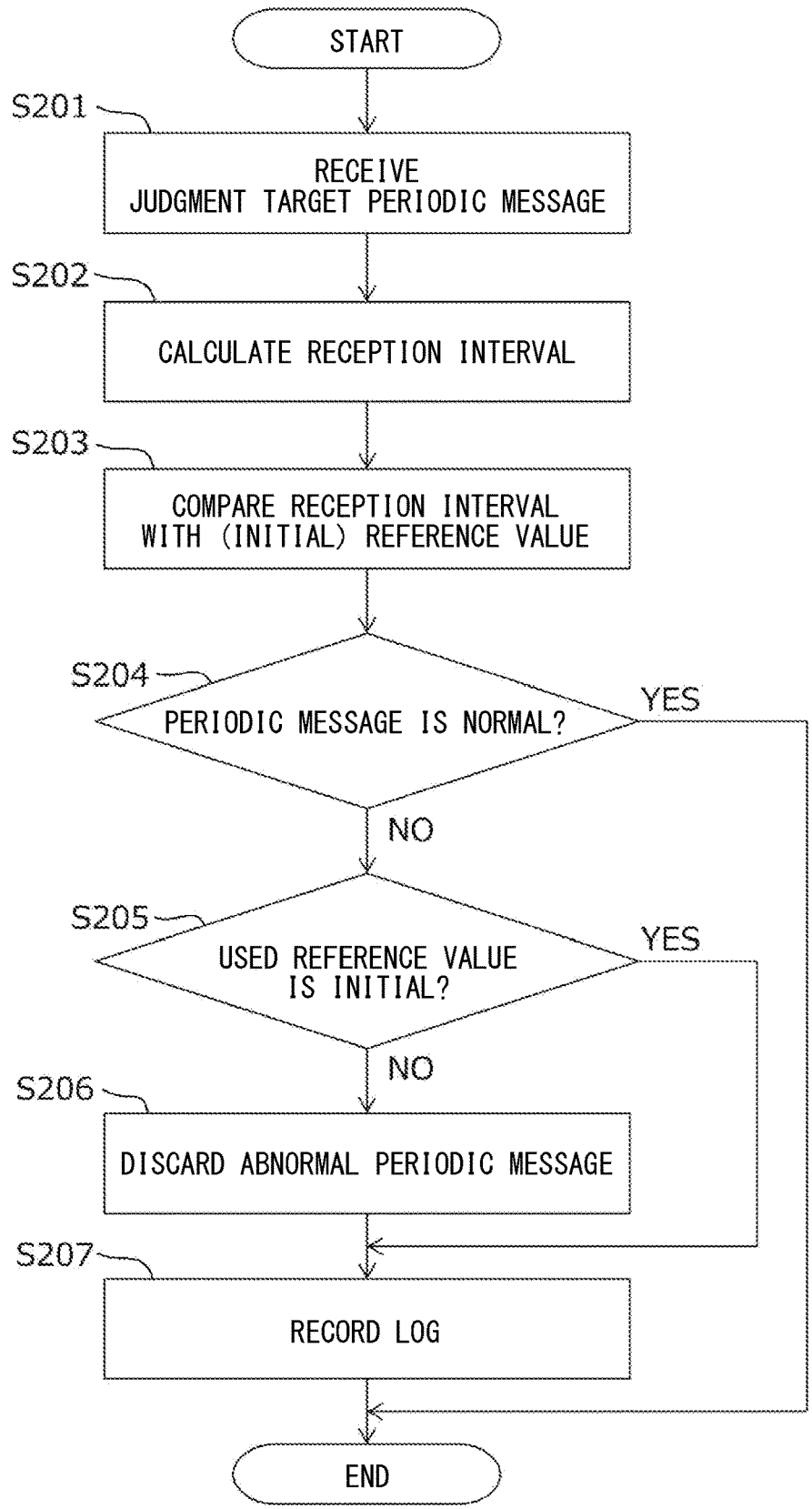
FIG. 4 is a diagram illustrating the operation of the information processing device according to the first embodiment.

Next, FIG. 4 shows an operation of judging whether or not the periodic message received by the receiver unit 101 is normal among the operations of the information processing device 10 of the present embodiment. When the receiver unit 101 receives the periodic message as the judgment target periodic message (S201), the reception interval calculation unit 102 calculates the reception interval of the received periodic message and the message received immediately before it (S202). When the reception interval is calculated, the message judgment unit 105 compares the calculated reception interval with the initial reference value or the reference value determined by the process of FIG. 3 (S203). Here, until the determination unit 103 determines the reference value of the reception interval in the series of processes shown in FIG. 3, the reference value used in S203 is the initial reference value stored in advance in the judgment reference storage unit 104. On the other hand, after the determination unit 103 determines the reference value of the reception interval in the series of processes shown in FIG. 3, the reference value used in S203 is the reference value determined by the determination unit 103.

Suppose a case where as a result of comparing the calculated reception interval with the reference value in S203, it may be judged that the reception interval is not within the range of the reference value and the periodic message is not normal (S204: No). In such a case, it is then judged whether or not the reference value used in S203 is the initial reference value (S205). When the used reference value is not the initial reference value but the reference value determined by the determination unit 103 (S205: No), the periodic message judged to be abnormal is discarded (S206). Then, a log indicating that an abnormal periodic message is received is saved or recorded in the log storage unit 106 (S207). On the other hand, when the used reference value is the initial reference value (S205: Yes), the periodic message is not discarded, and a log indicating that an abnormal periodic message is received is saved (S207).

If it is judged whether or not the message is normal by using the initial reference value instead of the reference value obtained by learning, the reliability of the judgment result may not be high. Therefore, even if the message judgment unit 105 judges that the message is not normal, it may actually be a normal message, and it is desirable not to discard the message judged to be not normal. On the other hand, when it is judged whether or not the periodic message is normal by using the reference value determined based on the actually received message, the reliability of the judgment result is high. Therefore, in this case, the periodic message judged to be not normal is discarded.

Further, when the message judgment unit 105 judges that the periodic message is not normal, it is desirable to keep a log so that it can be used for data analysis. Therefore, when the message judgment unit 105 judges that the periodic message is not normal, the log storage unit 106 stores a log indicating that an abnormal periodic message is received regardless of whether or not the judgment is made using the initial reference value.

In FIG. 4, when it is judged that the periodic message is not normal, the periodic message judged to be not normal is discarded (S206) and the log is saved (S07). At the same time, in addition to these processes, it may be notified to other information processing devices included in the in-vehicle system that an abnormal periodic message is received.

In the first embodiment, the determination unit 103 determines the reference value of the reception interval and judges whether or not the message is normal based on the reception interval of the received periodic message. However, the determination unit 103 may determine the reference value of the length of the message instead of the reference value of the reception interval, and judge whether or not the message is normal based on the length of the received periodic message.

According to the first embodiment, it is possible to learn and determine a reference value for judging whether or not a message is normal based on a reception interval of the periodic messages. Therefore, it is possible to judge the correctness/incorrectness of the message with high accuracy without setting the reference value for each vehicle.

Second Embodiment

The first embodiment has described a configuration for determining a reference value of the reception interval, which is a judgment reference for judging whether or not the periodic message is normal, based on the reception interval. The present embodiment will describe the configuration for determining the reference value of the amount of change, which is the judgment reference for judging whether the periodic message is normal, based on the amount of change in the data indicated by the message, while focusing on the differences from the first embodiment.

FIG. 5 shows the information processing device 11 of the present embodiment. The information processing device 11 includes a change amount calculation unit 107 instead of the reception interval calculation unit 102 shown in FIG. 2. The change amount calculation unit 107 calculates the change amount of one message of the learning periodic messages received by the receiver unit 101 from another message received by the receiver unit 101 immediately before the one periodic message. The change amount calculation unit 107 further calculates the change amount to the message received by the receiver unit 101 as the judgment target periodic message in the same manner.

Here, the change amount may be a value indicating the degree of change, and may be the rate of change as well as the difference between the two messages.

The determination unit 103 determines the reference value of the change amount used as the judgment reference for judging whether or not the judgment target periodic message is normal, based on the change amount calculated by the change amount calculation unit 107.

Figures 8, 9:
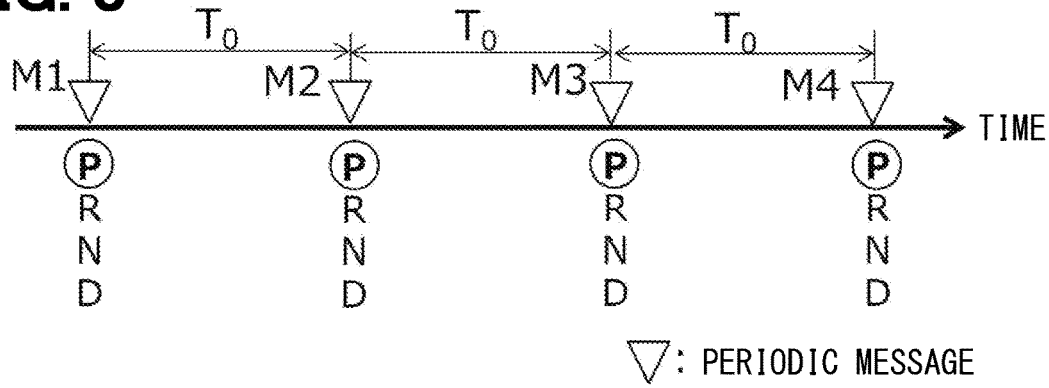
FIG. 8 is a diagram illustrating a message reception state according to the second embodiment.
FIG. 9 is a diagram for explaining the amount of change in the message according to the second embodiment.
Figure 10:
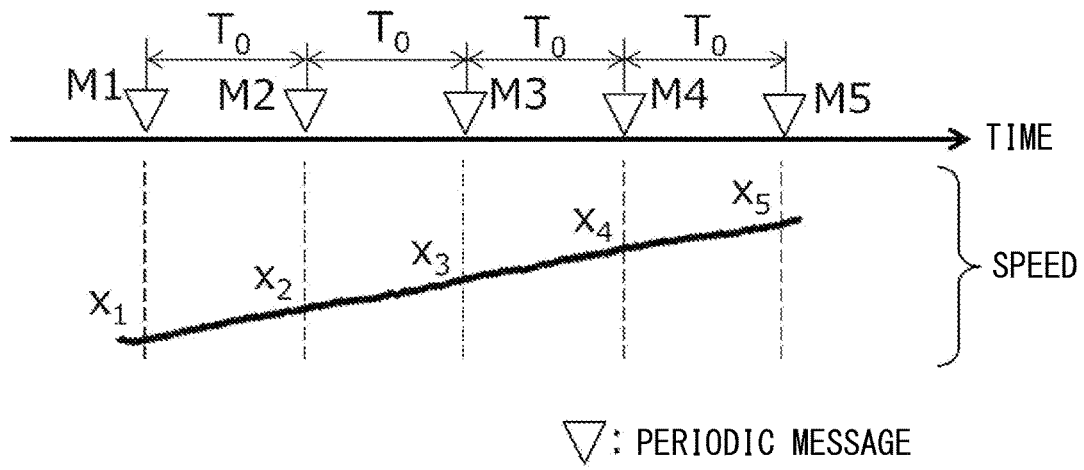
FIG. 10 is a diagram for explaining a reception state and the amount of change in the message according to the second embodiment.

FIGS. 6, 8 and 10 show three examples of messages received by the information processing device 11.

FIG. 6 shows a case where the periodic message indicates one of two states, for example, the ON/OFF state of the switch. In FIG. 6, the receiver unit 101 periodically receives the messages M1 to M4 indicating the switch ON state at the reception interval T0. For the sake of simplicity, the content of the message is represented by ON/OFF, and these ON/OFF are, for example, a numerical value of 0 or 1 represented by 1 bit. Therefore, when the receiver unit 101 receives the message shown in FIG. 6, the change amount calculation unit 107 calculates the change amount of the numerical value represented by one bit.

FIG. 7 shows the calculation result of the change amount calculation unit 107 regarding the periodic message shown in FIG. 6. The change amount 0 shown in FIG. 7 indicates that the data indicated by the two messages are both ON or OFF, and there is no change. On the other hand, the change amount 1 indicates that, for example, one of the two messages is ON, the other data is OFF, and the state of the switch has changed. In the example shown in FIG. 7, the probability that the amount of change is 0 is 100%, and the probability that the amount of change is 1 is 0%. Therefore, the determination unit 103 determines that the change amount reference value is 0.

FIG. 8 shows a case where the periodic message indicates one of a plurality of preset states, for example, the state of a shift lever. In FIG. 8, the receiver unit 101 periodically receives the messages M1 to M4 indicating the state in which the shift lever is P (that is, parking) at the reception interval T0. Note that R, N, and D indicate a state in which the shift lever is R (that is, reverse), an N (that is, neutral) state, and a D (that is, drive) state, respectively.

In FIG. 8, the content of the message is represented by P, R, N, and D for ease of explanation, but the information are, for example, numerical values represented by 2 bits. Therefore, when the receiver unit 101 receives the messages shown in FIG. 8, the change amount calculation unit 107 calculates the change amount of the numerical value represented by 2 bits.

FIG. 9 shows the calculation result of the change amount calculation unit 107 regarding the periodic message shown in FIG. 8. In FIG. 8, "1" in the message is a value corresponding to P, "2" in the message is a value corresponding to R, "3" in the message is a value corresponding to N, and "4" in the message is a value corresponding to D. For example, in the example shown in FIG. 9, the probability that the amount of change is 0 is 100%, and the probability that the amount of change is other than 0 is 0%. Therefore, the determination unit 103 determines that the change amount reference value is 0.

FIG. 10 shows a case where the periodic message indicates an optional numerical value detected by a sensor, for example. In this example, the message indicates the vehicle speed.

In the example shown in FIG. 10, the message indicates the value of speed X. Therefore, when the receiver unit 101 receives the message shown in FIG. 10, the change amount calculation unit 107 calculates the amount of change in the speed indicated by each message. This amount of change is, for example, the difference between X1 and X2, or the rate of change from X1 to X2 (that is, the slope). Then, the determination unit 103 determines the reference value of the amount of change to the periodic message as the difference or the rate of change. The amount of change in speed may vary depending on the amount of accelerator depression and the like. In this way, when the amount of change fluctuates due to other parameters, the reference value of the amount of change according to the other parameters may be determined. For example, the accelerator depression amount may be classified into a plurality of stages, and a reference value for a plurality of speed changes may be determined for each stage.

The contents of the messages and the values of the amount of change shown in FIGS. 6 to 10 are merely examples, and are not limited to these examples.

Also in the present embodiment, it is judged whether or not the message is normal by the same method as in the first embodiment. However, unlike the first embodiment, in the present embodiment, the reference value of the amount of change is used, instead of the reception interval, as a judgment reference for judging whether or not the message is normal. Also in this embodiment, the judgment reference storage unit 104 stores the initial reference value of the preset amount of change. Until the determination unit 103 determines the reference value of the amount of change, it may be judged whether or not the periodic message is normal based on the initial reference value.

According to the present embodiment, it is possible to learn and determine a reference value for judging whether or not a message is normal based on the content of the message. It is thus possible to judge the correctness/incorrectness of a message without setting a reference value for each vehicle.

Third Embodiment

According to the configurations of the first and second embodiments, it is possible to determine the judgment reference of the periodic message transmitted from the transmission source information processing device 20 by learning. It is noted that the message transmitted from the transmission source information processing device 20 includes not only a periodic message but also a message transmitted, for example, by being triggered by the occurrence of a predetermined event. When a message is transmitted by being triggered by the occurrence of an event, the message will be transmitted at a timing different from the normal period. Therefore, if it is judged whether or not the message is normal based on the reception interval, it may be judged that the message transmitted and received by being triggered by the event is not normal. Further, the amount of change in such a message is considered to be different from the amount of change in a periodic message.

Therefore, the present embodiment will describe the configuration for judging whether the message transmitted and received by being triggered by the occurrence of an event is normal, in addition to the messages transmitted and received periodically, while focusing on the differences from the first and second embodiments.

Figure 11:
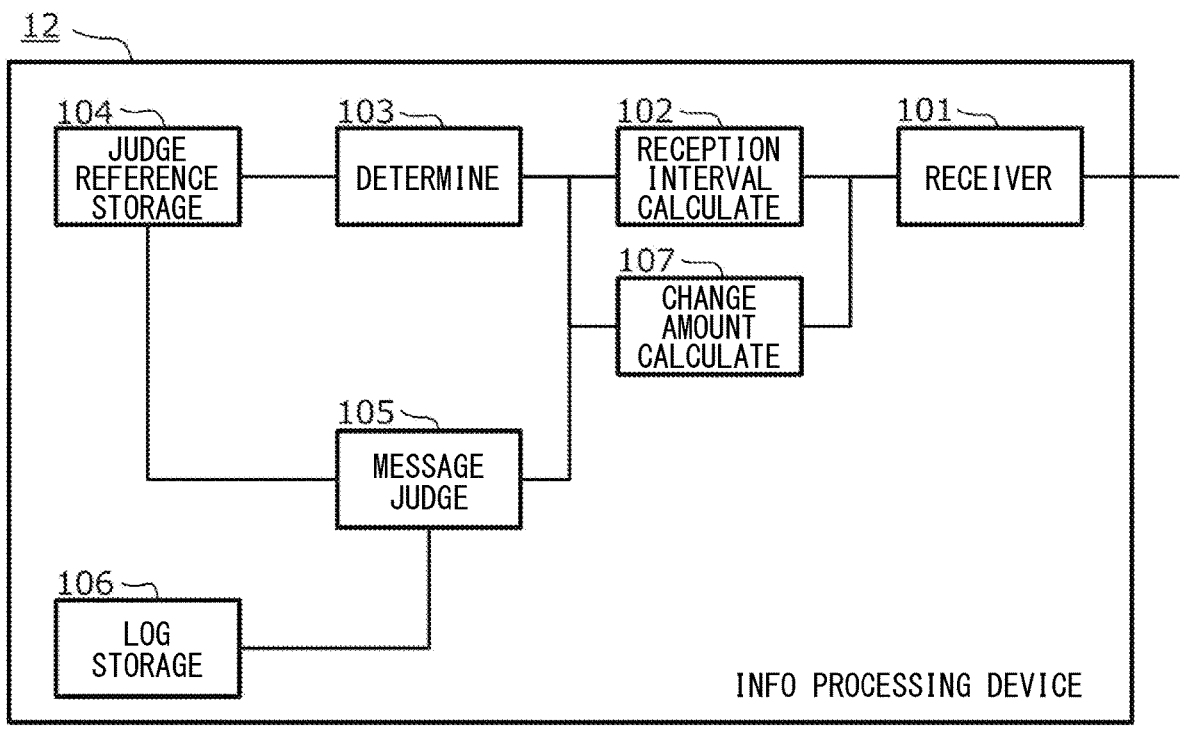
FIG. 11 is a block diagram of an information processing device according to a third embodiment.

FIG. 11 shows the information processing device 12 of the present embodiment. The information processing device 12 includes both a reception interval calculation unit 102 shown in FIG. 2 and a change amount calculation unit 107 shown in FIG. 5.

The receiver unit 101 of the present embodiment receives, in addition to the periodic message, a non-periodic message, which is a message transmitted when a predetermined event occurs, from the transmission source information processing device 20. Whether the message received by the receiver unit 101 is a periodic message or a non-periodic message can be judged by the reception interval between a message and another message received immediately before the message. For example, if the reception interval between a message and another message received immediately before the message is within the range of the reference value described in the first embodiment, it is judged that the message is a periodic message. If it is out of the range of the reference value, it is judged to be a non-periodic message. Similar to the periodic message in the first and second embodiments, the receiver unit 101 receives the non-periodic message as a learning non-periodic message for determining the judgment reference. At the same time, it is also received as a judgment target non-periodic message to be judged whether or not the non-periodic message is normal.

The reception interval calculation unit 102 of the present embodiment calculates the reference value of the reception interval by using the same method as that of the first embodiment. However, when the reference value of the reception interval of the periodic message is calculated including the reception interval of the non-periodic message, the accurate reference value of the reception interval of the periodic message cannot be calculated. Therefore, the reception interval calculation unit 102 detects the reception interval of the non-periodic message by using an outlier test method such as the Smirnov-Grubbs test or the Thompson test. The reference value of the reception interval of the periodic message is calculated by excluding the reception interval of the non-periodic message. In the present embodiment, the periodic message and the non-periodic message are distinguished by calculating the reference value of the reception interval using the method of the first embodiment. However, a method different from that of the first embodiment may also be used to distinguish between a periodic message and a non-periodic message.

Similar to the second embodiment, the change amount calculation unit 107 calculates the amount of change to one periodic message of the learning periodic messages received by the receiver unit 101 from another message received by the receiver unit 101 immediately before the one periodic message. Further, the change amount calculation unit 107 of the present embodiment calculates the amount of change (i.e., non-periodic change amount) to one non-periodic message of the learning non-periodic messages received by the receiver unit 101, from another message received by the receiver unit 101 immediately before the one non-periodic message. The change amount calculation unit 107 further calculates the amount of change to the message received by the receiver unit 101 as the judgment target periodic message or the judgment target non-periodic message in the same manner.

The determination unit 103 determines a reference value of the amount of change used as a judgment reference for judging whether or not the judgment target periodic message and the judgment target non-periodic message are normal, respectively, based on the change amounts calculated by the change amount calculation unit 107. More specifically, the reference value for the amount of change to the periodic message is determined based on the amount of change to the learning periodic message; in contrast, the amount of change (i.e., non-periodic change amount reference value) to the non-periodic message is determined based on the amount of change to the learning non-periodic message.

The reference value of the amount of change to the periodic message can be determined according to the second embodiment. Therefore, in the present embodiment, the reference value of the amount of change to the non-periodic message will be mainly described.

Hereinafter, a case where each of the messages described in the second embodiment is transmitted with the occurrence of a predetermined event as a trigger in addition to the periodic timing will be described.

FIG. 12 shows a case where the message shows one of two states, such as the ON/OFF state of the switch, as in FIG. 6, and further, both a periodic message and a non-periodic message are received. In this example, since the event occurs after receiving the message M2, the non-periodic message M3 is received at the non-periodic timing. The reception interval T1 between the messages M2 and M3 is shorter than the reception interval T0 for transmitting the periodic message. Further, the messages M1 and M2 indicate the switch ON state, and the messages M3 and M4 indicate the switch OFF state.

FIG. 13 shows the calculation result of the change amount calculation unit 107 regarding the non-periodic message. The probability that the amount of change to the non-periodic message becomes 0 is 30%, and the probability that the amount of change to the non-periodic message becomes 1 is 70%. Therefore, the determination unit 103 determines that the reference value of the amount of change to the non-periodic message is 1.

Suppose a case where the amount of change to the non-periodic message is 0, that is, the ON/OFF of the switch does not change even though the event has occurred. Such a case indicates that a non-periodic message is transmitted and received by an event other than ON/OFF of the switch.

FIG. 14 shows one of a plurality of preset states of the message, as in FIG. 8, and further shows a case where both a periodic message and a non-periodic message are received. Since the event occurs after receiving the message M2 or M4, the non-periodic message M3 or M5 is received at the non-periodic timing. The reception interval T1 between the messages M2 and M3 and the reception interval T2 between the messages M4 and M5 are shorter than the periodic reception interval T0.

FIG. 15 shows the calculation result of the change amount calculation unit 107 regarding the non-periodic message. Unlike in FIG. 9, the probability that the amount of change becomes 0 depends on the value of the non-periodic message or the value of the message received immediately before the non-periodic message (that is, the previous message). For example, in the example shown in FIG. 15, the probability that the amount of change to the non-periodic message becomes 0 is 60% when the previous message is 1, and 10% when the previous message is 3. That is, it is not possible to determine a reference value that serves as an accurate judgment reference only by the amount of change to the non-periodic message. Therefore, the determination unit 103 determines the change amount reference value for each value of the message received immediately before the non-periodic message or for each value of the non-periodic message. For example, when the previous message is 1, the probability that the change amount of the non-periodic message becomes 0 is 60%, and the probability that the change amount becomes 1 is 35%. Therefore, the determination unit 103 determines that the change amount reference value of the non-periodic message when the previous data is 1 is 0 or 1. Further, when the previous message is 3, the probability that the change amount of the non-periodic message is −1 is 40%, and the probability that the change amount is 1 is 40%. Therefore, the determination unit 103 determines that the change amount reference value of the non-periodic message when the previous data is 3 is −1 or 1.

Figure 16:
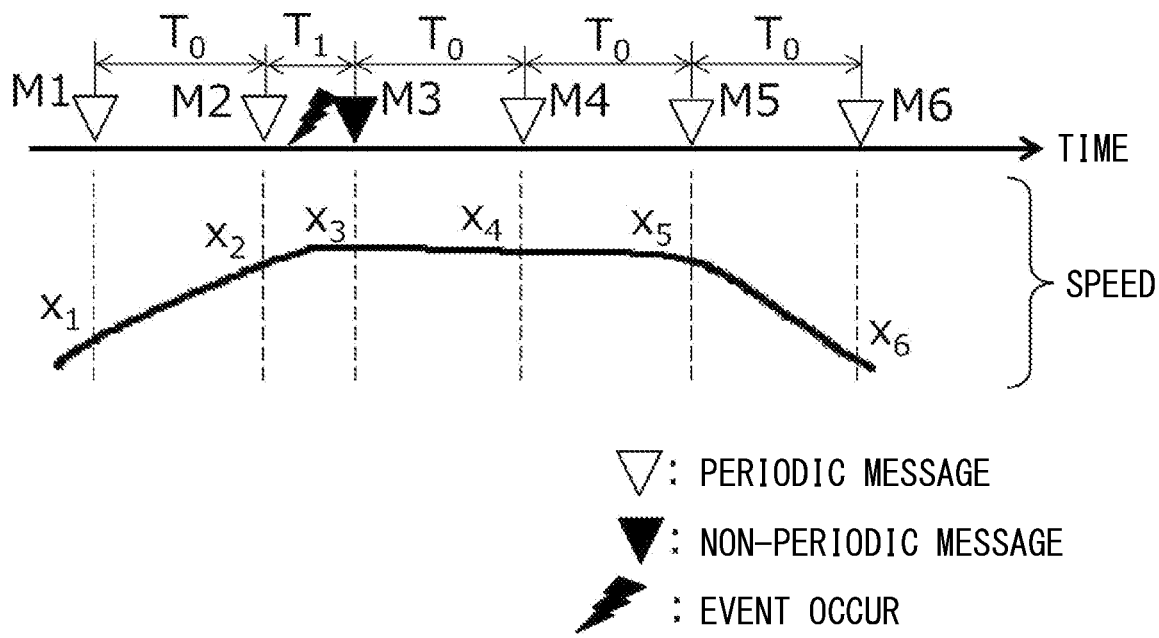
FIG. 16 is a diagram illustrating a reception state and the amount of change in the message according to the third embodiment.

FIG. 16 shows a case where the message indicates an optional numerical value as in FIG. 10, and shows an example in which an event occurs and both a periodic message and a non-periodic message are received. For example, when a brake operation is performed as an event, the transmission source information processing device 20 transmits a non-periodic message at a non-periodic timing. As shown in FIG. 16, the receiver unit 101 periodically receives messages other than the message M3 at the receiving interval T0. Further, since the brake operation is performed after receiving the message M2, the message M3 is received at a non-periodic timing. The reception interval T1 between the messages M2 and M3 is shorter than the periodic reception interval T0.

Here, the amount of change to the periodic message shown in FIG. 16 is different from that in FIG. 10, in that the amount of change from the message M1 to the message M2, the amount of change from the message M3 to the message M4, the amount of change from the message M4 to the message M5, and the amount of change from the message M5 to the message M6 are different from each other. Therefore, when the message indicates an optional numerical value, it is desirable to determine a plurality of change amount reference values. For example, in the example shown in FIG. 16, based on the amount of change from the message M1 to the message M2, the first change amount reference value for the periodic message is determined. Based on the amounts of changes from the message M3 to the message M4 and from the message M4 to the message M5, the second change amount reference value for the periodic message is determined. Further, based on the amount of change from the message M5 to the message M6, the third change amount reference value for the periodic message is determined. Further, based on the amount of change from the message M2 to the message M3, the change amount reference value for the non-periodic message is determined.

Also in the present embodiment, it is judged whether or not the message is normal by the same method as in the first embodiment. Further, also in the present embodiment, the judgment reference storage unit 104 may store the initial reference value of the amount of change of the non-periodic message set in advance. In this case, it may be judged whether or not the non-periodic message is normal based on the initial reference value until the determination unit 103 determines the reference value of the change amount for the non-periodic message.

As described above, according to the present embodiment, even when a non-periodic message is transmitted/received in addition to the periodic message, it is possible to learn and determine the judgment reference for judging correctness/incorrectness of the message.

Fourth Embodiment

In the above embodiment, as shown in FIGS. 2, 5 and 11, the information processing device 10, 11, 12 judges whether or not the message received by the receiver unit 101 is normal. On the other hand, in the present embodiment, the information processing device 13 of the present disclosure does not judge whether or not the message is normal, and transmits the reference value determined by the determination unit 103 to another information processing device. The differences from the first to third embodiments will be mainly described.

Figure 17:
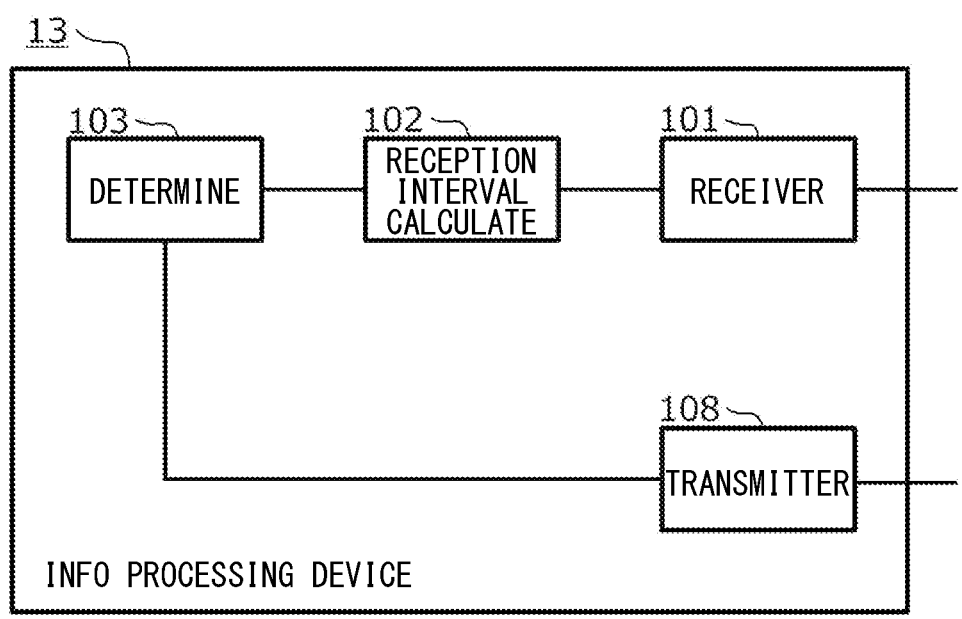
FIG. 17 is a block diagram of an information processing device according to a fourth embodiment.

FIG. 17 shows the information processing device 13 according to a fourth embodiment. The information processing device 13 according to the fourth embodiment includes a receiver unit 101, a reception interval calculation unit 102, a determination unit 103, and a transmitter unit 108, which may also be referred to as a transmitter.

Similar to the above-described embodiments, the information processing device 13 according to the fourth embodiment is provided to determine the reference value used as a judgment reference for judging whether the judgment target periodic message or the judgment target non-periodic message is normal based on the message received from the transmission source information processing device 20 (which may also be referred to as a first different information processing device). The transmitter unit 108 transmits the reference value determined by the determination unit 103 to, for example, the information processing device 21 (which may also be referred to as a second different information processing device) shown in FIG. 1. Here, the information processing device 21 to which the information processing device 10 transmits the judgment reference is also referred to as a transmission destination information processing device.

The transmission destination information processing device 21 receives the message transmitted from the transmission source information processing device 20 via the communication network 2. At this time, the transmission destination information processing device 21 judges whether or not the message received from the transmission source information processing device 20 is normal by using the reference value received from the information processing device 13 of the present disclosure.

The information processing devices of the first to third embodiments are information processing devices 10, 11, 12 mounted on a vehicle to form an in-vehicle system 1. However, the information processing device 13 according to the fourth embodiment does not have to be mounted on the vehicle, and may be provided outside the vehicle. In this case, the receiver unit 101 of the information processing device 13 receives a message from the transmission source information processing device 20 mounted on the vehicle via the wireless communication network, and determines a reference value based on the message. Then, the transmission unit 108 of the information processing device 13 transmits the reference value to the transmission destination information processing device 21 mounted on the vehicle via the wireless communication network.

According to the present embodiment, even if each information processing device constituting the in-vehicle system does not determine the judgment reference, each information processing device can judge the correctness/incorrectness of the message by using the reference value determined by learning.

(Overview)

The features of the information processing device in each embodiment of the present disclosure have been described above.

Terms used in the description of each embodiment are examples and may be replaced with synonymous terms or terms having a synonymous function.

Each of the block diagrams used in the description of the embodiments (i.e., block diagrams in FIGS. 2, 5, 11, and 17) is each of the diagrams in which the configurations of devices and the like are classified and organized by functions. These functional blocks are realized by any combination of hardware or software. Further, since the functions are shown, the block diagram can be understood as disclosure of the method and the program that implements the method.

In other words, the information processing device 10, 11, 12, 13, 20, and 21, which may also be referred to as an electronic control unit or a controller, and methods thereof described in the present disclosure in the above embodiments may be implemented by a special purpose computer.

Such a special purpose computer may be implemented (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

Order of functional blocks that can be grasped as processing, a sequence, and a method described in relation to each embodiment may be changed unless some restriction is imposed, for example, a result from one step is utilized at another step.

The terms of "first" and "second" used in the description of each embodiment and claims are for discriminating two or more configurations and methods of the same kind and do not limit order or superiority or inferiority.

The present disclosure can be realized not only by the dedicated hardware having the configuration and the function described in each embodiment, but also a program for realizing the present disclosure stored in a storage medium such as a memory or a hard disk, and an executable program thereof. It can also be realized as a combination with a dedicated or general-purpose hardware having a general-purpose CPU and memory.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. Consequently, when the program is upgraded, the latest function is always provided.

INDUSTRIAL APPLICABILITY

Although the information processing device of the present disclosure has been described as an information processing device for a vehicle mainly used in an automobile, it can be applied not only to an information processing device for a vehicle but also to an information processing device used for various purposes.

For reference to further explain features of the present disclosure, the description is added as follows.

There are known various types of information processing devices mounted on automobiles. Such various types of information processing devices are connected with each other by a communication network such as CAN (Controller Area Network) to configure an in-vehicle system. In such an in-vehicle system, there is known a network-based intrusion detection system (NIDS) used to detect suspicious access or data from the outside.

There is disclosed a communication system and a communication method capable of judging the correctness/incorrectness of a message communicated by a communication system with a simple configuration. In this communication system, a plurality of ECUs are connected to a communication bus in order to enable communication of messages. A specified communication interval is set for each ECU; the ECU transmits the message based on the specified communication interval. Upon receiving the transmitted message, the ECU detects the communication interval of the received message, and judges whether the received message is correct/incorrect based on the comparison between the detected communication interval and the specified communication interval.

By the way, in addition to the communication interval of the message, it is conceivable to judge the correctness/incorrectness of the message by using the data stored in the message, the message length, and the like. In either case, the correctness/incorrectness of the received message is judged based on the comparison between (i) the set reference value and (ii) the communication interval of the received message or the data stored in the received message. However, the inventor of the present disclosure has found an issue that it may not be possible to accurately judge the correctness/incorrectness of a message when the reference value set uniformly in advance is used. This is because (i) the communication interval of the message may differ depending on the vehicle type, or (ii) the data or message length stored in the message may differ depending on the equipment of the vehicle and/or the usage environment of the vehicle.

It is thus desired for the present disclosure to learn and determine a judgment reference used for judging the correctness/incorrectness of a message.

Aspects of the present disclosure described herein are set forth in the following clauses.

According to a first aspect of the present disclosure, an information processing device is connected via a communication network to a different information processing device configured to transmit a periodic message that is a message transmitted after a fixed period of time from when another message immediately preceding the message is transmitted. The information processing device includes a receiver, a reception interval calculation unit, and a determination unit. The receiver is configured to receive the periodic message as a learning periodic message. The reception interval calculation unit is configured to calculate a reception interval between (i) a one message of the learning periodic message and (ii) a different one message that is received by the receiver immediately before the one message. The determination unit is configured to determine a reference value of the reception interval of the periodic message based on the calculated reception interval. Herein, the reference value is used as a judgment reference to judge whether or not a judgment target periodic message is normal, the judgment target periodic message being the periodic message transmitted by the different information processing device after the reference value is determined.

According to a second aspect of the present disclosure, an information processing device is connected via a communication network to a different information processing device configured to transmit a periodic message that is a message transmitted after a fixed period of time from when another message immediately preceding the message is transmitted. The information processing device includes a receiver and a change amount calculation unit, and a determination unit. The receiver is configured to receive the periodic message as a learning periodic message. The change amount calculation unit is configured to calculate a change amount to a one message of the learning periodic message from a different one message that is received by the receiver immediately before the one message. The determination unit is configured to determine a reference value of the change amount to the periodic message based on the calculated change amount. Herein, the reference value is used as a judgment reference to judge whether or not a judgment target periodic message is normal, the judgment target periodic message being the periodic message transmitted by the different information processing device after the reference value is determined.

According to a third aspect of the present disclosure, a reference value learning program product is provided to be stored in a non-transitory computer readable storage medium. The reference value learning program product is used in an information processing device connected via a communication network to a different information processing device configured to transmit a periodic message that is a message transmitted after a fixed period of time from when another message immediately preceding the message is transmitted. The reference value learning program product includes instructions. The instructions includes: receiving the periodic message as a learning periodic message; calculating a reception interval between (i) a one message of the learning periodic message and (ii) a different one message that is received immediately before the one message; determining a reference value of the reception interval of the periodic message based on the calculated reception interval; and using the reference value as a judgment reference to judge whether or not a judgment target periodic message is normal, the judgment target periodic message being the periodic message transmitted by the different information processing device after the reference value is determined.

According to a fourth aspect of the present disclosure, a reference value learning method is provided to be executed by at least one processor in an information processing device connected via a communication network to a different information processing device configured to transmit a periodic message that is a message transmitted after a fixed period of time from when another message immediately preceding the message is transmitted. The method includes receiving the periodic message as a learning periodic message; calculating a reception interval between (i) a one message of the learning periodic message and (ii) a different one message that is received immediately before the one message; determining a reference value of the reception interval of the periodic message based on the calculated reception interval; and using the reference value as a judgment reference to judge whether or not a judgment target periodic message is normal, the judgment target periodic message being the periodic message transmitted by the different information processing device after the reference value is determined.

According to the information processing device, the reference value learning program product, and the reference value learning method of the present disclosure, by learning and determining the judgment reference for judging whether or not a message transmitted from another information processing device is normal, the accuracy of judging whether or not the message is normal can be improved.

What is claimed is:

1. An information processing device connected via a communication network to a different information processing device configured to transmit (a) a periodic message that is a message transmitted after a fixed period of time from when another message immediately preceding the message is transmitted and (b) a non-periodic message that is a message when a predetermined event occurs,
   the information processing device comprising:
   a receiver configured to receive the periodic message as a learning periodic message;
   a processor and memory, the memory storing computer executable instructions that, when executed by the processor, configure the processor to implement:
   a change amount calculation unit configured to calculate (a) as a first change amount, a change amount to a one message of the learning periodic message from a different one message that is received by the receiver immediately before the one message, and (b) as a second change amount, a change amount to one non-periodic message of the learning periodic message from the periodic message or the non-periodic message received immediately before reception of the one non-periodic message by the receiver; and
   a determination unit configured to determine a first reference value of the change amount to the periodic message based on the first change amount and to determine a second reference value of the change amount to the non-periodic message based on the second change amount,
   wherein:
   the first and second reference values are used as a judgment reference to judge whether or not a judgment target message is normal, the judgment target message being the message transmitted by the different information processing device after the first and second reference values are determined.

2. The information processing device according to claim 1, further comprising:
   a storage configured to store the reference value determined by the determination unit;
   wherein:
   the receiver is further configured to receive the judgment target periodic message from the different information processing device; and
   the processor and memory are further configured to implement a message judgment unit configured to judge whether or not the judgment target periodic message is normal based on the reference value.

3. The information processing device according to claim 2, wherein:
   the receiver is further configured to receive a first judgment target periodic message that is the periodic message transmitted by the different information processing device before the reference value is determined;
   the storage is further configured to store a preset initial reference value;
   the message judgment unit is further configured to judge whether or not the first judgment target periodic message is normal based on the initial reference value until the determination unit determines the reference value; and
   the message judgment unit is further configured to judge whether or not a second judgment target periodic message of the judgment target periodic message is normal based on the reference value after the reference value is determined.

4. The information processing device according to claim 3, wherein:
   in response to the message judgment unit judging that the first judgment target periodic message is not normal, the first judgment target periodic message judged to be not normal is not discarded; and
   in response to the message judgment unit judging that the second judgment target periodic message is not normal, the second judgment target periodic message judged to be not normal is discarded.

5. The information processing device according to claim 4, wherein:
   in response to the message judgment unit judging that the first judgment target periodic message or the second judgment target periodic message is not normal, a log indicating a reception of an abnormal periodic message is stored in the storage.

6. The information processing device according to claim 1, further comprising:
a transmitter configured to transmit the reference value to a second different information processing device connected via the network,
wherein:
the judgment target periodic message is received from the different information processing device as a first different information processing device; and
the received judgment target periodic message is transmitted by the transmitter to the second different information processing device, which is configured to judge whether or not the judgment target period message is normal.

7. A computer-implemented reference value learning method executed by at least one processor in an information processing device connected via a communication network to a different information processing device configured to transmit (a) a periodic message that is a message transmitted after a fixed period of time from when another message immediately preceding the message is transmitted and (b) a non-periodic message that is a message when a predetermined event occurs,
the method comprising:
receiving the periodic message as a learning periodic message;
calculating (a) as a first change amount, a change amount to a one message of the learning periodic message from a different one message that is received by the receiver immediately before the one message, and (b) as a second change amount, a change amount to one non-periodic message of the learning periodic message from the periodic message or the non-periodic message received immediately before reception of the one non-periodic message by the receiver; and
determining a first reference value of the change amount to the periodic message based on the first change amount and determining a second reference value of the change amount to the non-periodic message based on the second change amount;
wherein the first and second reference values are used as a judgment reference to judge whether or not a judgment target message is normal, the judgment target message being the message transmitted by the different information processing device after the first and second reference values are determined.

8. A non-transitory computer readable storage medium storing a reference value learning program product comprising instructions for execution by a computer, the instructions including the reference value learning method according to claim 7, the method being computer-implemented.

9. The information processing device according to claim 1, further comprising:

a storage configured to store the reference value determined by the determination unit;
wherein:
the receiver is further configured to receive the judgment target periodic message from the different information processing device; and
the computer executable instructions, when executed by the processor, further configure the processor to implement a message judgment unit configured to judge whether or not the judgment target message is normal based on the reference value.

10. The information processing device according to claim 1, further comprising:
a transmitter configured to transmit the reference value to a second different information processing device connected via the network,
wherein:
the judgment target periodic message is received from the different information processing device as a first different information processing device; and
the received judgment target periodic message is transmitted by the transmitter to the second different information processing device, which is configured to judge whether or not the judgment target period message is normal.

11. An information processing device connected via a communication network to a different information processing device configured to transmit (a) a periodic message that is a message transmitted after a fixed period of time from when another message immediately preceding the message is transmitted and (b) a non-periodic message that is a message when a predetermined event occurs,
the information processing device comprising:
a receiver configured to receive the periodic message as a learning periodic message;
one or more processors in communication with the receiver and configured to calculate (a) as a first change amount, a change amount to a one message of the learning periodic message from a different one message that is received by the receiver immediately before the one message, and (b) as a second change amount, a change amount to one non-periodic message of the learning periodic message from the periodic message or the non-periodic message received immediately before reception of the one non-periodic message by the receiver, and to determine a first reference value of the change amount to the periodic message based on the first change amount, and to determine a second reference value of the change amount to the non-periodic message based on the second change amount, the first and second reference values being used as a judgment reference to judge whether or not a judgment target message is normal, the judgment target message being the message transmitted by the different information processing device after the first and second reference values are determined.

* * * * *